INVENTORS
PER OLOF RAGNAR PERSSON
OSKAR EDVIN RUDOLF NORDSTRÖM
BY Hane and Nydick
ATTORNEYS May 12, 1964 P. O. R. PERSSON ETAL 3,133,163

TELEPHONE INSTRUMENTS

Filed Aug. 11, 1960 4 Sheets-Sheet 2

INVENTORS
PER OLOF RAGNAR PERSSON
OSKAR EDVIN RUDOLF NORDSTRÖM
BY Hane and Nydick
ATTORNEYS May 12, 1964 P. O. R. PERSSON ETAL 3,133,163

TELEPHONE INSTRUMENTS

Filed Aug. 11, 1960 4 Sheets-Sheet 3

INVENTORS
PER OLOF RAGNAR PERSSON
OSKAR EDVIN RUDOLF NORDSTRÖM

BY Hane and Nydick

ATTORNEYS

INVENTORS
PER OLOF RAGNAR PERSSON
OSKAR EDVIN RUDOLF NORDSTRÖM
BY Hane and Nydick
ATTORNEYS United States Patent Office 3,133,163
Patented May 12, 1964

3,133,163
TELEPHONE INSTRUMENTS

Per Olof Ragnar Persson, Sundbyberg, and Oskar Edvin Rudolf Nordstrom, Hagersten, Sweden, assignors to Telefonaktiebolaget L M Ericsson, Stockholm, Sweden, a corporation of Sweden Filed Aug. 11, 1960, Ser. No. 48,871
Claims priority, application Sweden Aug. 31, 1959
10 Claims. (Cl. 179—179)

The invention relates to telephone instruments, and more particularly to the casing of the instrument.

Modern telephone instruments are often constructed portable. It is known to form the casing of the instrument, generally a plastic casing, with a recess under the cradle, a suitable grip for lifting the instrument being thus obtained. With said lifting recess under the cradle, it is thereby natural when the instrument is lifted, the hand rests against the hand set of the instrument when the latter rests in the cradle.

In order to simplify manufacture of the instrument, and in particular the casing thereof, and in order to obtain a suitable design of the grip for the hand, the recess is bounded formed partly by the casing proper and partly by movable components of the instrument.

With portable telephone instruments of the general kind above referred to, joining of the cover part and the base part of the instrument in a manner which is simple and reliable and which permits convenient separation of the two parts presents considerable difficulties.

It is a broad object of the invention to provide a novel and improved telephone instrument casing, especially a casing made of a plastic material, the cover of which may be secured to the bottom plate without requiring any mounting parts fixedly molded to or otherwise integral with the cover and/or the bottom plate.

A specific object of the invention is to provide a novel and improved telephone instrument casing the bottom and cover parts of which can be secured to each other by means of a single locking element which can be tightened or loosened without requiring that the instrument be turned upside down.

Another specific object of the invention is to provide a novel and improved telephone instrument casing the single locking element of which is so disposed that it is not readily apparent to a layman, thus reducing the danger of tampering with the instrument by a subscriber. If desired, the locking element can be conveniently sealed by the telephone company.

Still another specific object of the invention is to provide a novel and improved telephone instrument casing in which the cover part is secured to the bottom part by pressure so as to avoid deformation of the bottom which would render the instrument unstable.

A further specific object of the invention is to provide a novel and improved telephone instrument casing the components of which used for securing the cover part and the bottom part to each other may be manufactured with rather wide tolerances, as the inherent springiness of the casing assembly will absorb such tolerances.

Other and further objects, features and advantages of the invention will be pointed out hereinafter and set forth in the appended claims constituting a part of the application.

Figures 1, 3:
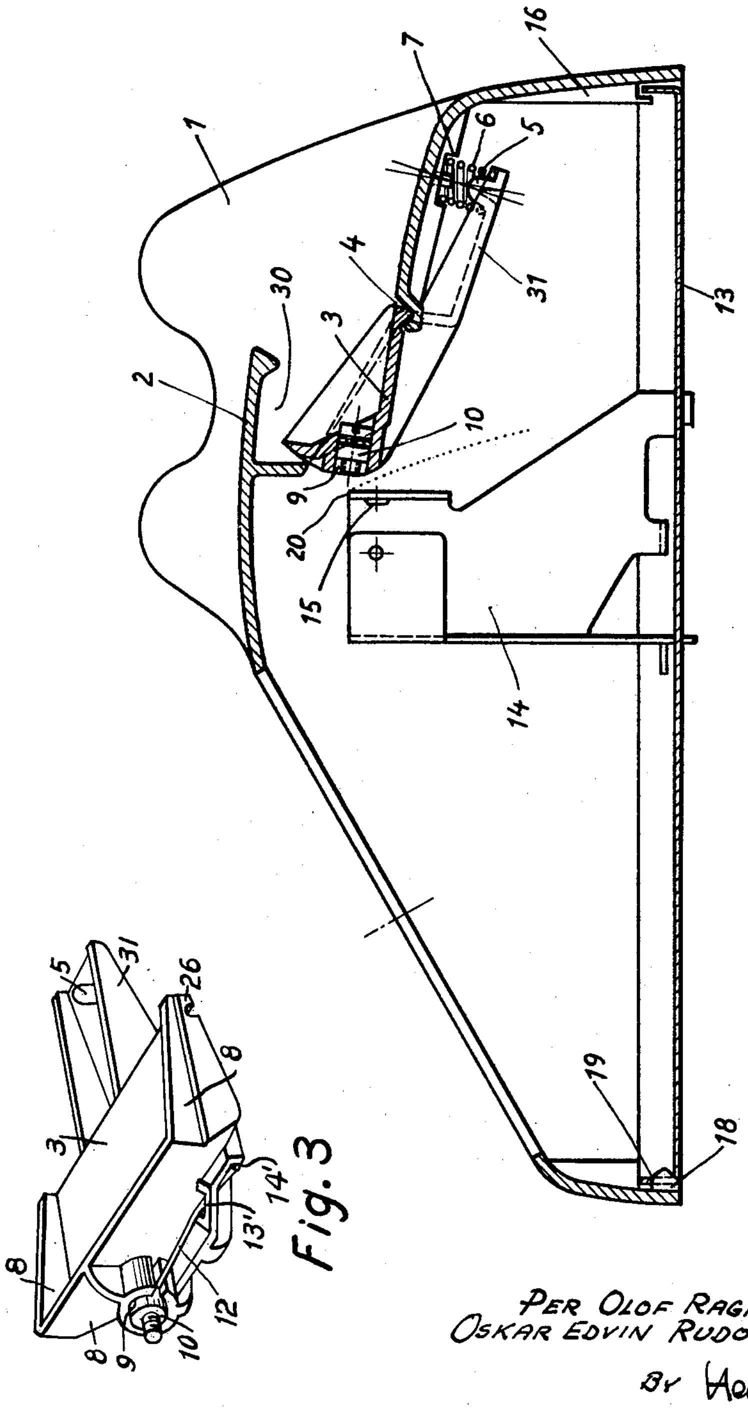
Figure 4:
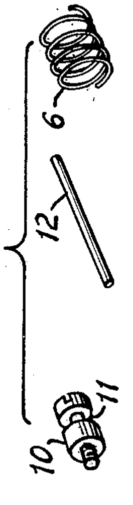
Figures 2, 8:
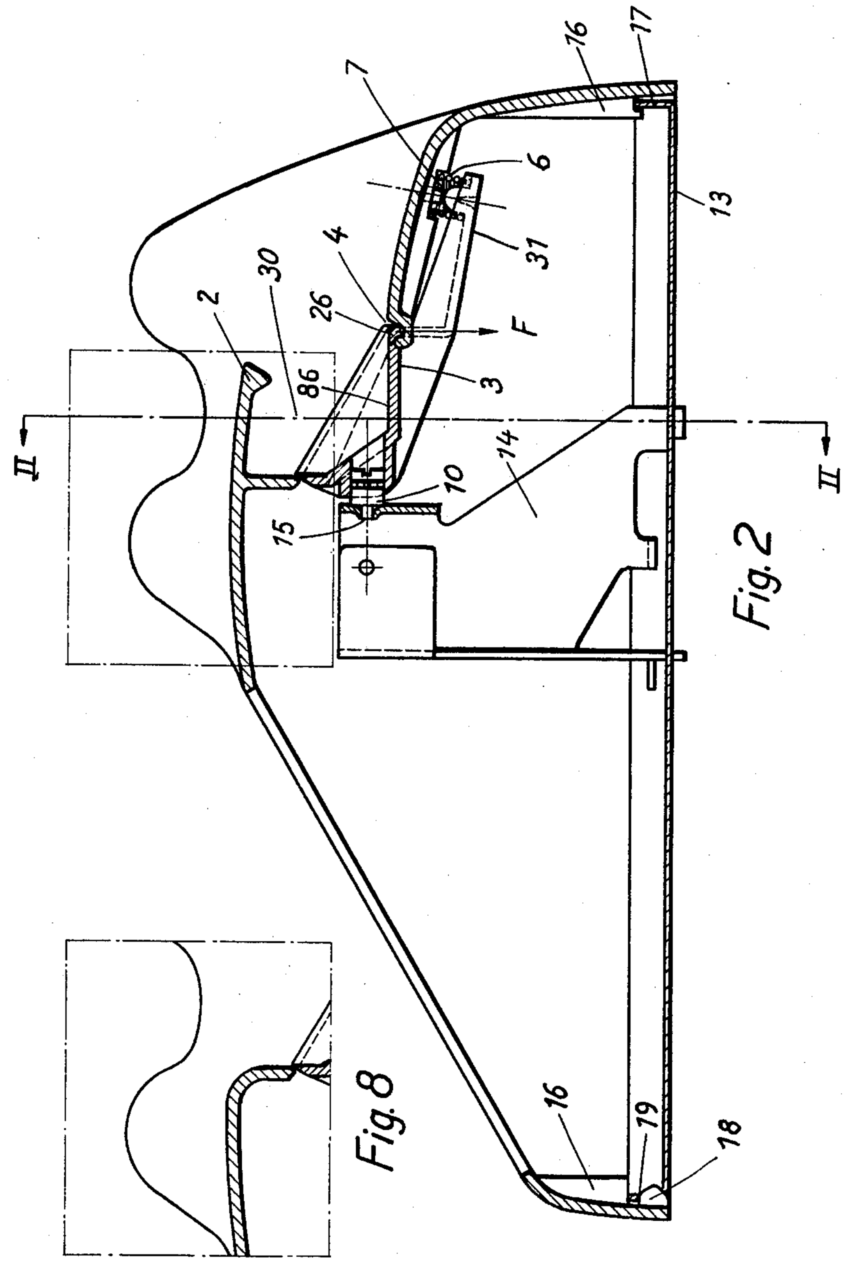
Figure 6:
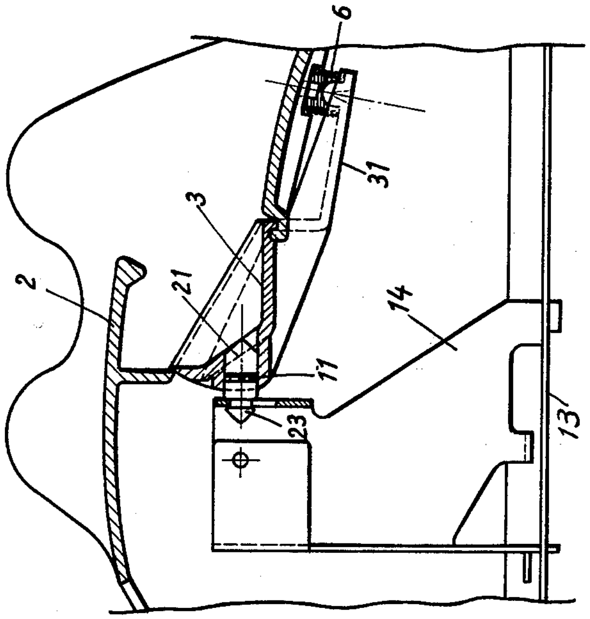
Figure 5:
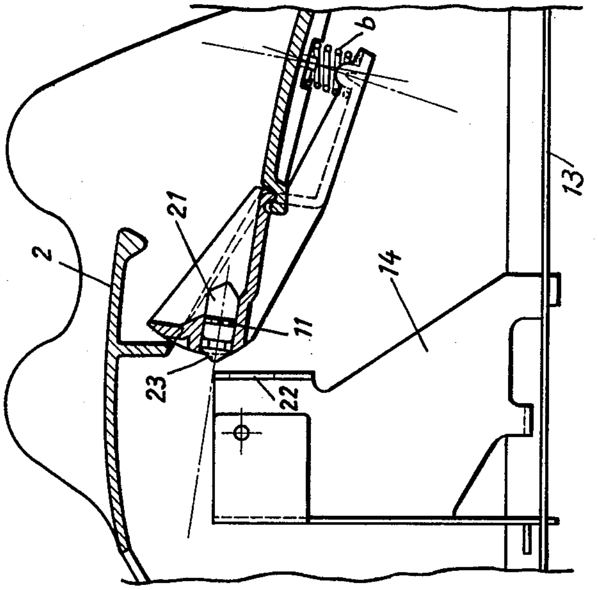
Figure 7:
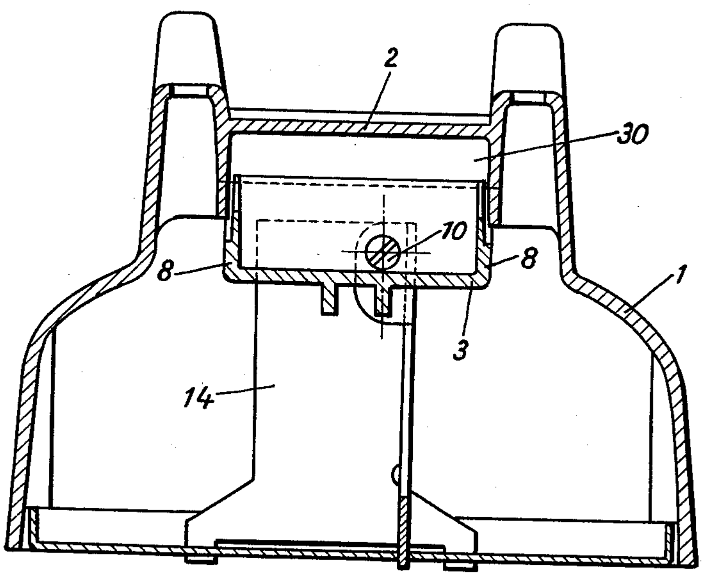

The invention will be described more in detail with reference to the accompanying drawings, of which FIG. 1 is a longitudinal section (perpendicular to the bottom plate in plane of symmetry) with the cradle in released position, FIG. 2 is the same section but with the lever assembly in locking position, FIG. 3 is a perspective view of the lever assembly seen sideways from above, and FIG. 4 shows in perspective three components of the lever assembly. FIGS. 5 and 6 correspond to FIGS. 1 and 2 and show a modified embodiment of the locking member of the lever assembly. FIG. 7 is a section taken along the line II—II in FIG. 2. FIG. 8 shows a modification of a detail of FIG. 2.

As shown in FIG. 1, the instrument casing 1 is, in a way known per se, formed with a lifting recess 30, which has a protruding wall 2 for conveniently lifting the instrument. A two-arm lever 3, 31 (FIGS. 1 and 3) is arranged in the instrument. To support the lever, the instrument casing is formed with a groove 4 and the lever with a ridge 26 (FIG. 3) whereby a bearing is obtained around which the lever can pivot. Arm 31 of the lever has at its end a lug 5 for guiding and supporting a spiral spring 6. A corresponding suitable guide lug 7 for the spring is provided on a casing wall.

The lever is formed with walls 8, FIG. 3, which abut against the wall of the casing during the movement of the lever in the casing, so that the casing of the instrument can be constructed insectproof. The arm 3 and portions of walls 8 of the lever form the bottom and walls for the recess 30 thus closing the casing. Possibly the two side portions of walls 8 can be omitted, provided the casing is formed so that it forms side walls for the recess. The front portion of walls 8 form a bearing 9 for a screw 10 (FIGS. 1 and 3) provided with an annular notch 11 (FIG. 4) which is engaged by a springy wire 12 (FIGS. 3 and 4) retained on supports 13′ and 14, whereby the screw is resiliently pressed in against the lever in the position shown in FIG. 1. FIG. 3 shows the screw 10 in protruding position.

A frame 14 is fastened on the bottom plate 13 on the instrument (FIG. 1) for supporting the switch-hook and fastening the set of contact springs associated therewith. These two last-mentioned and other components of the instrument not essential for the understanding of the invention are omitted in the drawing. In a frame 14 a threaded hole 15 is placed so that if the lever is turned counter-clockwise, so that the spiral spring 6 is compressed, the axis of said threaded hole and the axis of the screw 10 will coincide. In this position the screw 10 can be screwed into the threaded hole 15. The described parts will then occupy the position shown in FIG. 2.

From the wall of the casing at 7 (see FIG. 2) a force, owing to the compression of the spiral spring 6, will be transmitted to the lever 3, 31 and from there over the bearing 4, 26 (inversely proportionally to the length of the moment arms) to the joint between the screw 10 and the threaded hole 15 in the frame 14 of the switch-hook. As a result, the casing is pressed against the bottom plate with a force F applied along the bearing 4, 26 (see the arrow in FIG. 2) and this force will depend upon the dimensioning and compression of the spiral spring 6. Reinforcement flanges 16 formed in the casing, which flanges may be placed along the circumference of the casing, will, owing to this force, press against the upper edge 17 of the bottom plate.

With the proportions that the figures show, the casing will rest against the bottom plate with harder pressure in the rear edge of the instrument than in the front edge. If the casing as shown in FIG. 1 is formed with an opening for a dial (or key set) and if the latter is fastened to a component fastened to the bottom plate and if the dial (key set) is tightened against the casing with a packing, this packing may tend to separate casing from the bottom plate at the front edge.

The arrangement according to the invention can therefore according to FIGS. 1 and 2 be combined with such an embodiment of the casing that the latter in front has a pair of lugs 18, which, when the casing is placed on the bottom plate, grip into notches 19 in the bottom plate (see FIGS. 1 and 2).

When placing the casing over the bottom plate the lugs 18 are first hooked into the notches 19 and the casing is shut down over the instrument. The corners 20 of the cradle frame 14 will then describe a substantially circular arc (dotted line in FIG. 1) in reference to the casing. The arrangement needs therefore to be such that the lever 3, 31 in released position, at the placing of the casing over the bottom plate, does not abut against this corner 20, and the screw 10 must be retracted, which retraction is produced by the springy wire 12, FIG. 3.

When the casing is to be taken off, only the screw 10 is loosened and then, as soon as said screw has cleared the threads of hole 15, it is retracted by the springy wire 12; the lever 3, 31 is thereby turned clockwise to its rest or released position (FIG. 1) by the spring, and the casing can be opened if it has lugs 18, or be lifted off, if the casing is constructed without lugs.

FIGS. 5 and 6 show a modified embodiment, which principally corresponds to the embodiment shown in FIGS. 1 and 2, but the locking screw 10 in the lever assembly according to FIGS. 1 and 2 has been replaced by a piston 21 with a conical flange 23. The springy wire 12 shown in FIG. 3, the point of which rests in the groove 11 and which tends to press the locking member against the lever assembly, is used in the embodiment according to FIGS. 5 and 6 also. The threaded hole 15 in the frame 14 according to FIGS. 1, 2 has in FIGS. 5, 6 been replaced by a wider non-threaded hole 22.

When the casing in this embodiment has been set down upon the base plate and the part of the lever assembly from the outside of the casing is pressed down so much that the piston 21 can be pushed through the hole 22, the piston is locked by a flange 23 snapping over the upper edge of the hole 22. If the lever assembly in this position is released a pressure is obtained between casing and bottom plate, as in the previously described embodiment. If it is desired to remove the casing, the lever assembly is pressed somewhat further down, whereby the flange 23 is released and the piston 21 is pushed back by the springy wire, whereupon the casing can be lifted. If the spiral spring 6 is dimensioned so that it is rather hard, the risk of unintentional pressing down upon the lever sufficient to release the piston is very small.

In the illustrated embodiments the invention has been shown in connection with an instrument provided with a lifting recess. This is not absolutely necessary; the invention can also be applied to instruments without a lifting recess. The protruding wall 2 may be omitted in this case and the part of the casing situated below the switch-hook may for example be formed as appears from FIG. 8.

We claim:

1. A casing for a telephone instrument, said casing comprising a hollow cover having a wall portion including an opening, and a base, a two-armed lever means pivotally supported upon one edge of said opening to form a fulcrum for the lever means, one arm of said lever means substantially occupying said opening, coacting locking means secured to said base and said one arm of said lever means, said lever means being pivotal between a locking position in which said locking means are in locking engagement and a release position in which said locking means are disengaged, the other arm of the lever means extending into the space within the cover in either position, and spring means urging said lever arm into the release position, whereby upon pivoting said lever means into the locking position against the action of the spring means and locking the lever means in said position, the cover is held under pressure against the base.

2. A casing according to claim 1, wherein said cover includes recessed wall portions, said recessed wall portions and said one arm of the lever means forming a grip for carrying the casing.

3. A casing according to claim 1, wherein said spring means are interposed between the inner wall surface of the cover and said other arm of the lever means.

4. A casing according to claim 1, wherein said locking means comprise a bracket rising from said base and secured thereto and including a receiving bore, and a locking element slidably extended through said one arm of the lever means, said locking element being engageable with said bore in the locking position of the lever means.

5. A casing according to claim 4, wherein said locking element comprises a portion slidable in said one arm of the lever means and a screw portion, and wherein said bore is threaded to receive said screw portion, said screw portion being accessible from the outside of the cover for screwing action.

6. A casing according to claim 4 and comprising a spring means engaging said locking element for urging the same into a position withdrawn from said receiving bore.

7. A casing according to claim 6, wherein said locking element is formed with an annular groove, and wherein the spring means coacting with said locking element comprises a springy wire engaging said groove at one end and secured to said lever means at the other end.

8. A casing according to claim 1, wherein said one arm of the lever means and said locking means are disposed in the locking position of the lever means in a plane substantially parallel to the base.

9. A casing according to claim 1, wherein said cover and said base are of generally oblong configuration, said cover being pivotally connectible along one of its short edges to a short edge of the base, said lever means being disposed in the part of the cover remote from said connectible edges, and wherein the other short edge of the base is raised, and a wall portion of the cover in said remote part of the cover and said raised edge of the base overlap each other, said overlapping portions being pressed against each other in the locking position of the lever means.

10. An arrangement in a telephone instrument, said arrangement comprising a casing placed over a bottom plate supporting telephone components, a frame secured to said bottom plate, a two-armed lever turnably mounted in bearing means provided in said casing, one arm of said lever being formed as a portion of the casing wall, a spring seated in said casing so as to act upon the second arm of said lever and urge said second arm to turn downward and said first arm to turn upward, a bolt member movably mounted in a bearing in said one arm and accessible from the outside of the casing, an opening for said bolt member being provided in said frame, said bolt member being capable of being introduced into said opening when said one arm, against the action of said spring, is manually pushed down to a position corresponding to that in which the axis of said bolt member is aligned with the axis of said opening in said frame, said one arm thereby being blocked against said turning movement upward and said bolt member exerting a force on said frame in an upward direction.

References Cited in the file of this patent

UNITED STATES PATENTS

| | | |
|---|---|---|
| 2,495,164 | Erickson | Jan. 17, 1950 |
| 2,644,861 | Jouban | July 7, 1953 |